US005559409A

United States Patent [19]

Beierwaltes et al.

[11] Patent Number: 5,559,409

[45] Date of Patent: Sep. 24, 1996

[54] AUTOMATED WINDOW SYSTEM AND METHOD FOR A BUILDING

[76] Inventors: William T. Beierwaltes, 1907 Gail Ct., Loveland, Colo. 80537; Kevin L. Miller, 6200 Becker La., Loveland, Colo. 80538

[21] Appl. No.: 373,851

[22] Filed: Jan. 18, 1995

[51] Int. Cl.[6] ........ H02P 1/00

[52] U.S. Cl. ........ 318/282; 49/386; 52/204.1

[58] Field of Search ........ 318/282; 49/386, 49/141, 158, 504, 505; 52/204.1, 200, 204.51

[56] References Cited

U.S. PATENT DOCUMENTS

| | | | |
|---|---|---|---|
| 881,772 | 3/1908 | Canney . | |
| 1,147,599 | 7/1915 | Bordwell . | |
| 2,072,083 | 3/1937 | Campbell | 268/117 |
| 2,106,081 | 1/1938 | Campbell | 268/117 |
| 2,684,239 | 7/1954 | Gaffney | 268/119 |
| 2,758,834 | 8/1956 | Sanford et al. | 268/23 |
| 2,917,791 | 12/1959 | Klein | 20/42 |
| 3,003,453 | 10/1961 | Jamieson | 114/235 |
| 3,020,039 | 2/1962 | Hynes et al. | 268/109 |
| 3,456,387 | 7/1969 | Tolson | 49/31 |
| 3,750,491 | 8/1973 | Herrmann | 74/625 |
| 3,845,585 | 11/1974 | Cecil | 49/139 |
| 4,085,629 | 4/1978 | Fogarollo | 74/625 |
| 4,210,277 | 7/1980 | Kolt | 236/49 |
| 4,367,660 | 1/1983 | Becker et al. | 74/625 |
| 4,464,651 | 8/1984 | Duhame | 340/521 |
| 4,476,854 | 10/1984 | Baer | 49/158 X |
| 4,481,735 | 11/1984 | Jentoft et al. | 49/325 |
| 4,505,561 | 3/1985 | Beckman et al. | 52/204.1 X |
| 4,544,865 | 10/1985 | Sharp | 318/53 |
| 4,544,866 | 10/1985 | Clemmons et al. | 318/54 |
| 4,553,656 | 11/1985 | Lense | 192/142 |
| 4,845,905 | 7/1989 | Frank | 52/72 |
| 4,879,842 | 11/1989 | Bailey | 49/141 |
| 4,945,678 | 8/1990 | Berner et al. | 49/322 |
| 5,004,961 | 4/1991 | Berner et al. | 318/65 |
| 5,006,766 | 4/1991 | Yuhas et al. | 318/53 |
| 5,012,613 | 5/1991 | Sekine | 49/362 |
| 5,131,188 | 7/1992 | Hutchison et al. | 49/504 X |
| 5,365,636 | 11/1994 | Jensen | 52/204.1 X |

FOREIGN PATENT DOCUMENTS

| | | |
|---|---|---|
| 0520934 | 12/1992 | European Pat. Off. . |
| 2386677 | 12/1978 | France . |
| 2605274 | 8/1977 | Germany . |

*Primary Examiner*—William M. Shoop, Jr.
*Assistant Examiner*—Karen Masih
*Attorney, Agent, or Firm*—William J. Kubida; Holland & Hart LLP

[57] ABSTRACT

An automated window system and method for a building utilizes a pair of gas springs to bias a window panel outward from a corresponding frame. A force opposing the gas springs is supplied by a motor driven spindle selectively winding and unwinding a cord coupled to the window panel sash adjacent the jamb portion of the frame and window. The cord is slidably retained to the jamb portion of the window sash through a pair of threadable pulls in order to equalize the forces supplied opposing the gas springs in the event of uneven winding of the cord due to buffeting or other forces while the window panel is being moved between an "open" to a "closed" position thereof.

18 Claims, 8 Drawing Sheets

AUTOMATED WINDOW SYSTEM AND METHOD FOR A BUILDING

BACKGROUND OF THE INVENTION

The present invention relates, in general, to an automated window system and method for a building. More particularly, the present invention relates to a simply manufactured and/or retrofittable window system of particular utility with respect to residential and office building awning, hopper and casement windows, as well as skylights, which is attractive in appearance, relatively low in cost and efficiently implemented.

Numerous automatic window systems have previously been described for hinged building windows and most generally incorporate a motor driven scissor-type mechanism which, due to its proximity to the window panel hinge point, present a significant risk to breakage in the event the window is buffeted by wind or other forces. Concomitantly, this type of mechanism has an inherently low mechanical advantage and can exert little leverage, particularly when the window panel is in the "closed", or "nearly closed" position.

In addition to their obvious mechanical shortcomings, such conventional designs have proven to be aesthetically deficient as well and either incorporate visually obtrusive motors or necessitate the provision of recessed access panels in the event the motorized mechanisms are capable of being substantially hidden from view. In any event, the actuator mechanisms themselves are inherently complex assemblies of numerous individual components and thus, relatively expensive to manufacture and install, over and above being generally specific to individual window sizes and types and obviously difficult to retrofit to existing windows.

Operationally, conventional designs incorporating scissor-like mechanisms are inherently limited in their range of motion and can not be fully opened to 90° from the "closed" position. Importantly, such windows also provide no readily implemented means for closing the window manually in the event of a power interruption and some specify an associated battery back-up power system for just such eventualities. Moreover, by their very nature, such conventional mechanisms generally require a secondary window locking system to provide an effective seal and to securely maintain the window in a fully closed position.

SUMMARY OF THE INVENTION

The automated window system and method of the present invention overcomes the significant disadvantages of conventional automatic building window designs through utilization of a "soft" actuation mechanism which resists breakage due to buffeting or other forces and can be readily closed by manual intervention in the event of power interruption. The automated window system of the present invention is efficient and straightforward in design and inherently highly leveraged providing efficient application of opposing opening and closing forces with respect to the hinged window panel. In operation, the design results in relatively little pressure being required to open the window while maximum opening force is maintained at the fully opened position.

As a further consequence of its design, the present invention provides an inexpensively implemented, adaptable system which is less costly to manufacture than conventional electrically actuated window systems and may be readily supplied as a new or replacement window or easily added to conventional hinged windows in existing construction without specialized equipment or extensive modifications to the wall surrounding the window frame. The system and method disclosed herein results in a visually pleasing design that has extensive applications in conjunction with, for example, passive solar homes in which the opening and closing of selected windows may be automatically controlled in response to ambient wind, precipitation and temperature conditions.

Broadly, what has been provided is an actuation system and method for a window including at least one window panel disposed in a hinged relationship with respect to a corresponding window frame. The window panel presents oppositely disposed proximal and distal portions thereof and spaced-apart first and second portions extending between the proximal and distal portions together comprising a window sash. The actuation system comprises means coupling the window frame and the window sash for biasing the window panel toward an "open" relationship with respect to the window frame. Additionally, means also couple the window frame and the window sash for opposing the biasing means and adjustably maintaining the window panel in a selected position with respect to the window frame. In a particular embodiment, the biasing means may comprise a pair of gas springs hingedly interconnecting the upper and lower window sill portions and the window frame. The opposing means may comprise a single generally elongate cord having at least one winding and threadable pull position therealong in conjunction with spindle means secured in conjunction with the window frame. The cord may be secured to the spindle means at the winding position thereon to effectuate spooling of the cord therearound, with the spindle means being operative to selectively draw at least one threadable pull position on the cord toward the spindle means in opposition to the biasing means.

In a further, more specific embodiment there is disclosed an actuation system for a window including at least one window panel having a peripherally surrounding window sash disposed in a hinged relationship with respect to a corresponding window frame. The window panel window sash presents oppositely disposed proximal and distal members thereof and generally parallel and spaced-apart first and second members extending between the proximal and distal members thereof. The actuation system comprises first and second expansible struts coupling the window frame and the first and second members of the window panel for biasing the window panel toward an "open" relationship with respect to the window frame. First and second threadable pulls, such as conventional screw eyelets, are affixed to the peripherally surrounding window sash for threadably guiding a cord for opposing a bias force exerted on the window panel by the first and second expansible struts. A spindle motor in conjunction with the window frame includes a generally elongate spindle having first and second ends thereof rotatably secured in conjunction with the window frame adjacent the distal member of said window sash for selectively winding and unwinding the cord about the spindle to effectuate closing and opening of the window panel or maintaining the same at any intermediate position between the fully "open" and fully "closed" positions.

Further provided is a method for selectively opening and closing a window panel having a peripherally surrounding window sash with respect to a corresponding window frame. The method comprises the steps of providing means coupling the window sash and the window frame for biasing the window panel toward an open relationship to the window frame by application of a biasing force therebetween. A spindle motor is further provided in conjunction with the window frame and includes a generally elongate spindle for winding a cord therearound. The cord is attached at one end thereof to the elongate spindle and at least one threadable pull is affixed to the window sash. The cord is threaded through the threadable pull and attached at an opposite end thereof to the elongate spindle. In operation, selective winding and unwinding of portions of the cord adjacent the ends thereof about the elongate spindle in response to actuation of the spindle motor opposes the biasing force to position the window panel with respect to the window frame.

BRIEF DESCRIPTION OF THE DRAWINGS

The foregoing and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
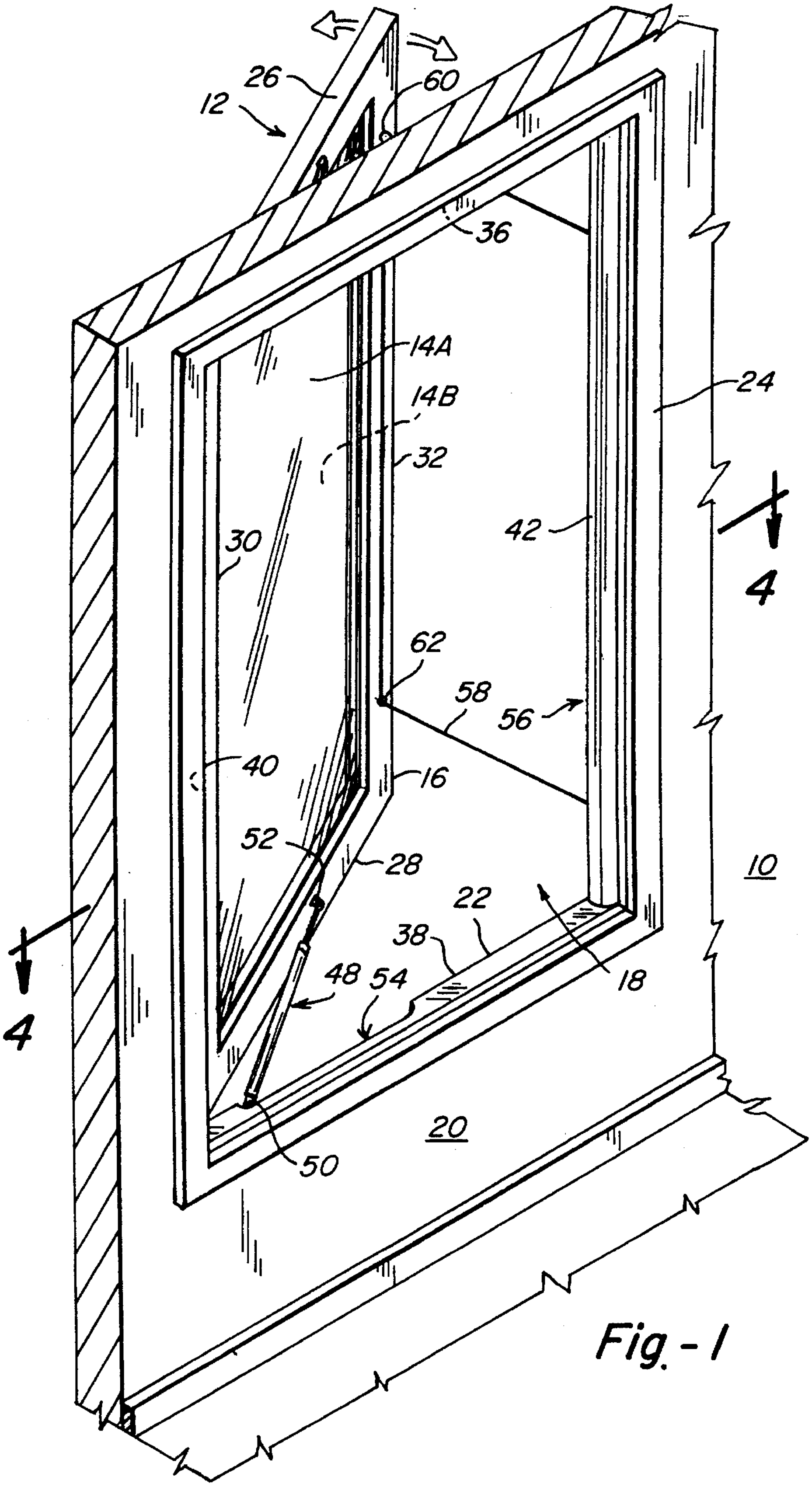
FIG. 1 is an interior isometric view of a particular embodiment of the window system of the present invention illustrating, for example, a hinged window comprising at least one or more window panes and a surrounding sash hingedly adjoining a corresponding window frame, the hinged window being biased towards a normally "open" position by a pair of gas springs coupling the window sash and frame and having a windable cord for selectively opposing the bias force imparted by the gas springs and maintaining the hinged window in a partially "open" position thereof.

With reference now to FIG. 1, a window system 10 in accordance with the present invention is shown. The window system 10 illustrated comprises, for example, a casement window 12 comprising a pair of translucent glass elements shown, for example, as inner pane 14A and outer pane 14B contained within a peripherally surrounding sash 16. When the panel of the hinged window 12 comprising inner and outer panes 14A, 14B, and sash 16 is "open" an opening 18 communicates between the inner wall 20 of a building, such as a residence, and the outside of the building incorporating the window system 10.

The opening 18 of the window system 10 is peripherally surrounded by a frame 22 and may be finished off by a decorative interior molding 24 adjoining the window system 10 frame 22 on the wall 20.

The sash 16, in the embodiment shown, comprises a pair of upper and lower sash portions 26, 28 adjoining the inner and outer panes 14A, 14B at the upper edges thereof and retaining the same in a generally parallel and spaced apart relationship. In like manner, the sash 16 also comprises a proximal, hinged sash portion 30 and opposite, distal jamb sash portion 32 interconnecting the upper and lower sash portions 26, 28. Correspondingly, the frame 22 comprises a pair of upper and lower frame members 36, 38 which, in a "closed" position, adjoin the upper and lower sash portions 26, 28 when the window system 10 is closed. In like manner, the frame 22 also comprises a hinged frame member 40 and jamb frame member 42 interconnecting the upper and lower frame members 36, 38 as shown.

Figure 2:
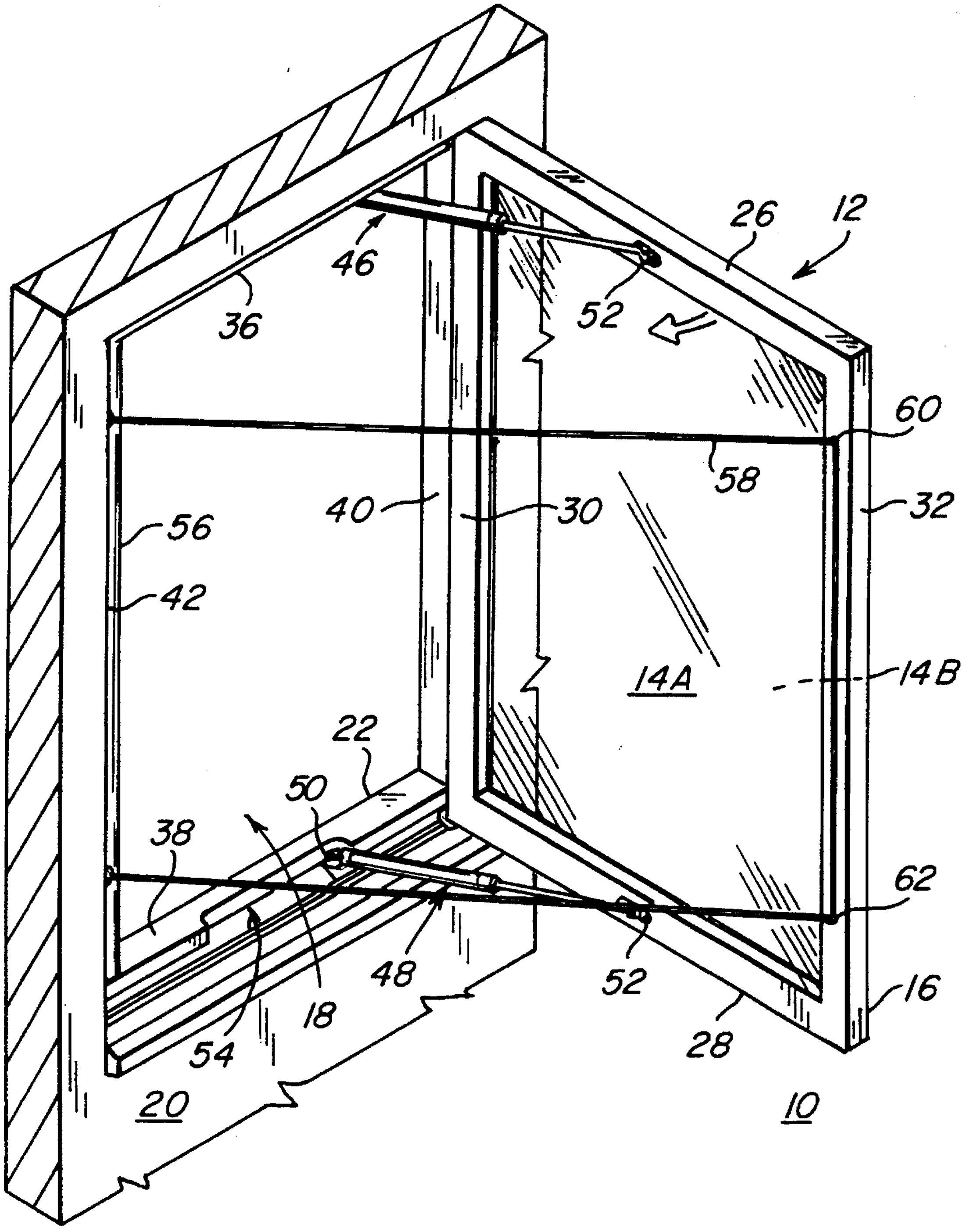
FIG. 2 is an external isometric view of the window system of FIG. 1 illustrating the hinged window in a substantially fully "open" position thereof.

With reference now additionally to FIG. 2, the window system 10 of FIG. 1 is shown from an outside perspective to additionally illustrate functional details thereof. In a particular embodiment, the window system 10 further comprises an upper gas spring 46 and corresponding lower gas spring 48 utilized to bias the hinged window 12 towards an "open" position with respect to the frame 22. In a preferred embodiment, the upper and lower gas springs 46, 48 may comprise Lift-O-Mat® gas springs available from Stabilus, 92 County Line Road, Colmar, Pa. 18915-9807. The upper and lower gas springs 46, 48 are available in a number of different lengths and pressures as is appropriate for the particular size of the hinged window 12 in the construction of a window system 10 in accordance with the present invention. In a preferred embodiment, the upper and lower gas springs 46, 48 might comprise Model Numbers H9505 or H9508 gas springs. The upper and lower gas springs 46, 48 present a proximal end 50 for hinged attachment to the upper frame member 36 and lower frame member 38 respectively. In like manner, the upper and lower gas springs 46, 48 further include a distal end 52 adjacent the piston rods thereof for hinged attachment to the upper sash portion 26 and corresponding lower sash portion 28. In the embodiment shown, the lower gas spring 48 pressure tube and fully retracted piston rod fits within a cut-out 54 in the lower frame member 38 when the hinged window 12 of the window system 10 is fully closed. In like manner, the upper gas spring 46 fits within a corresponding cut-out 54 of the upper frame member 36 (not shown). The cut-outs 54 allow the upper and lower gas springs 46, 48 to be mounted with respect to the sash 16 and frame 22 so as to be most visually unobtrusive yet still allow the hinged window 12 to be fully closed with respect to the associated frame 22. Additionally, although not illustrated, the upper and lower gas springs 46, 48 may be mounted within a partially enclosed channel formed in the upper and lower frame members 36, 38 in such a manner as to be completed concealed when the hinged window 12 is fully closed.

Figure 3:
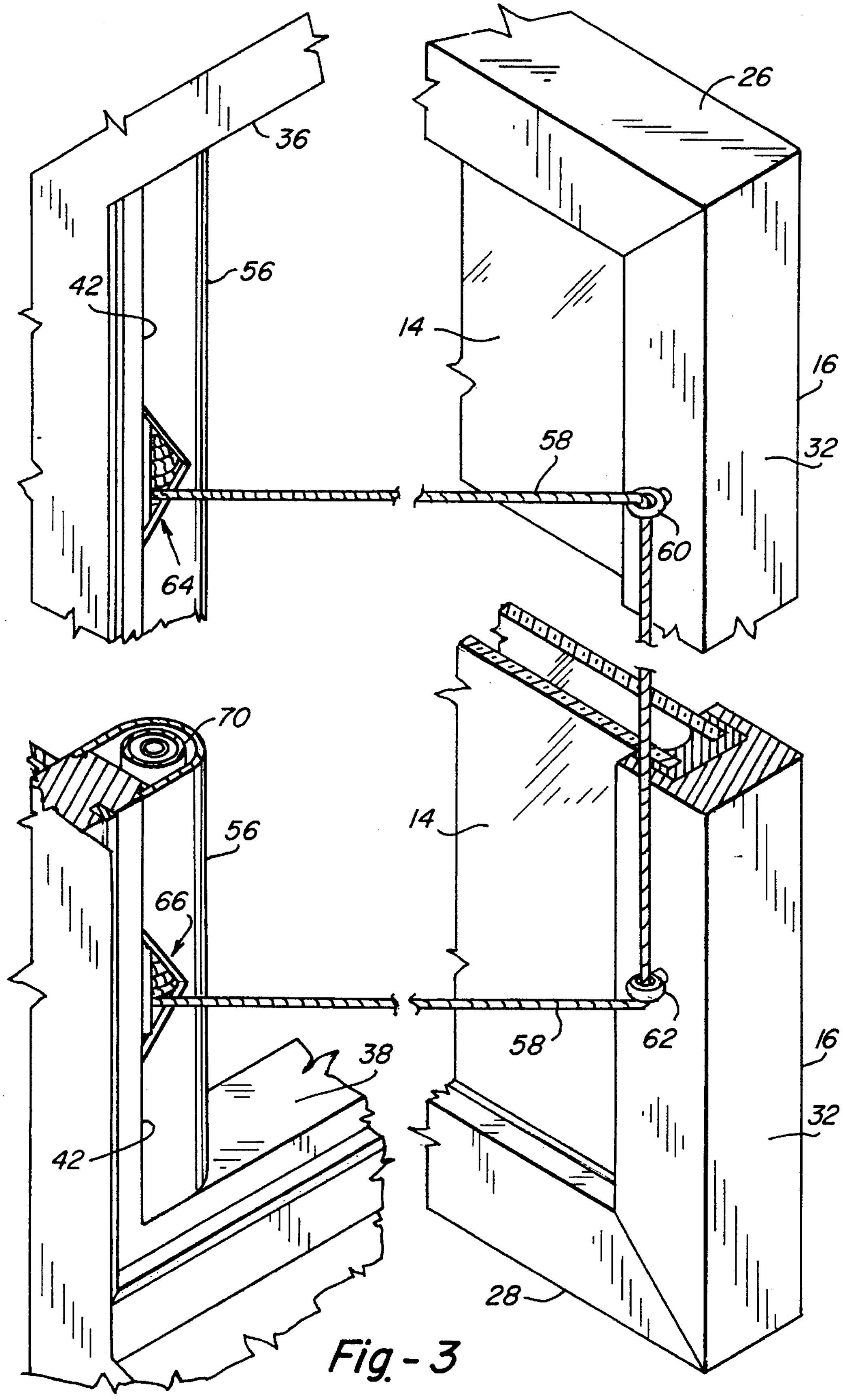
FIG. 3 is an enlarged, partially cut-away, external isometric view of the window system shown in FIG. 2 illustrating in greater detail the cord and upper and lower threadable pulls affixed to the window sash for selectively opposing the bias force imparted to the hinged window by the gas springs to position the hinged window intermediate a fully "open" and a "closed" position thereof dependant upon the length of the cord which is wound upon the spindle adjoining the jamb portion of the window system.

Referring additionally now to FIG. 3, further details of the window system 10 of the present invention are shown. Adjacent the jamb frame member 42 is a spindle cover 56 which serves to cover and visually finish a motorized spindle 70 as will be more fully described hereinafter. A cord 58 is selectively wound and unwound from the spindle 70 to either draw the hinged window 12 toward the frame 22 or allow the hinged window 12 to move toward an "open" position with respect to the frame 22 in response to the pressure exerted by the upper and lower gas springs 46, 48. The motorized spindle 70 may also be fully recessed into the jamb frame member 42 in particular applications obviating the particular spindle cover 56 shown to completely conceal the cord 58 when the hinged window is closed.

The cord 58 extends from the spindle 70 through an upper cord guide notch 64 formed within the spindle cover 56 and is threaded through an upper threadable pull 60 and corresponding lower threadable pull 62 secured to the jamb sash portion 32 of the hinged window 12. The cord 58 is again passed through a lower cord guide notch 66 formed within the spindle cover 56 and is likewise wound about the spindle 70. Although shown as threaded through the upper and lower threadable pulls 60, 62, the cord 58 may also be provided as two or more separate cords, each having one end secured to the spindle 70 and an opposite end secured to the window sash portion 32 or elsewhere on the window sash 16. In either instance, this configuration provides significant advantages over otherwise opposing the bias force of the upper and lower gas springs 46, 48 at a single central attachment point and results in a more even application of this force. The use of one or more cords in such a multi-point threading or attachment scheme is also less visually obtrusive than a single, centrally attached cord and, since forces opposing the bias of the upper and lower gas springs 46, 48 are more equally distributed, results in the obviation of any secondary locking mechanisms when the hinged window 12 is fully closed. Moreover, although the upper and lower threadable pulls 60, 62 are shown as comprising conventional screw eyelets, they may be provided as ferrules or the opposing ends of a channel or tube formed in or extending through a portion of the jamb frame member 42 and still provide the same functionality described.

Figure 4:
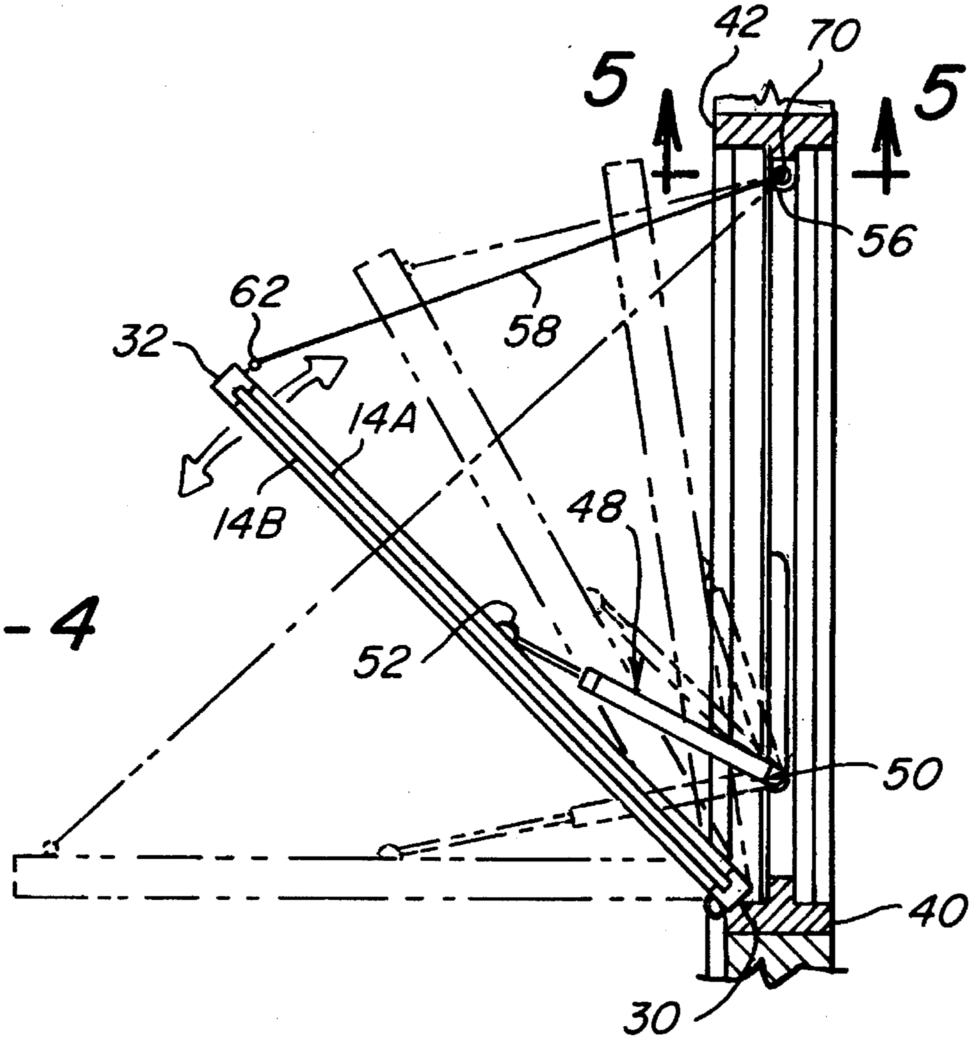
FIG. 4 is a partially cut-away, top plan view of the window system of FIG. 1 taken substantially along section line 4—4 thereof and illustrating the hinged window in a number of "partially open" and "open" positions thereof dependant upon the length of the cord that is wound about, or unwound from, the spindle.

With reference additionally now to FIG. 4, the range of positions with which the hinged window 12 may be held with respect to the frame 22 is shown. Depending upon the amount of the cord 58 which is wound about the spindle 70, the hinged window 12 may be positioned anywhere between a fully "closed" position and a fully "open" position at up to 90° with respect to the plane of the frame 22. By selectively actuating and stopping the motor (not shown) which drives the spindle 70 to wind the cord 58 about selected locations along its length, the hinged window 12 may also be held in any position intermediate the fully "closed" and fully "open" position by the opposing forces of the upper and lower gas springs 46, 48 and the tension applied to the cord 58 by maintaining the spindle 70 in a given position with respect thereto. As the cord 58 wraps about the spindle 70, as determined by the upper and lower cord guide notches 64, 66, the threadable pull positions of the cord 58 adjacent the upper and lower threadable pulls 60, 62 are drawn toward the spindle 70 to close the hinged window 12. Correspondingly, as the cord 58 is unwound from the periphery of the spindle 70, the threadable pull positions of the cord 58 adjacent the upper and lower threadable pulls 60, 62 is allowed to move away from the frame 22. The cord 58, which in a preferred embodiment may comprise a cable, Kevlar® or other similar synthetic or flexible cord, may also be threaded through one or any number of threadable pulls and still provide the advantage of balancing the forces opposing the upper and lower gas springs 46, 48 despite any variations in the manner in which the cord 58 might wind about the spindle 70.

In a preferred embodiment, the spindle cover 56 may be formed of aluminum, copper, molded plastic, or other similar structural material and supplied in various standard lengths sufficient to extend the desired length of the jamb frame member 42. The length of the spindle cover 56 as well as the upper and lower cord guide notches 64, 66 may be cut as required to fit a particular new installation or existing construction retrofit merely by making appropriate shear cuts at a desired length or to a desired depth as will be more fully described hereinafter. It should be noted that while triangular shaped upper and lower cord guide notches 64, 66 are illustrated herein, they may instead be of a rectangular, semi-circular or other suitable shape inclusive of a notch extending, for example, from the upper end of the spindle cover 56 to the upper wrapping position 72 of the spindle 70 shown and described hereinafter with respect to FIG. 5.

Figure 6:
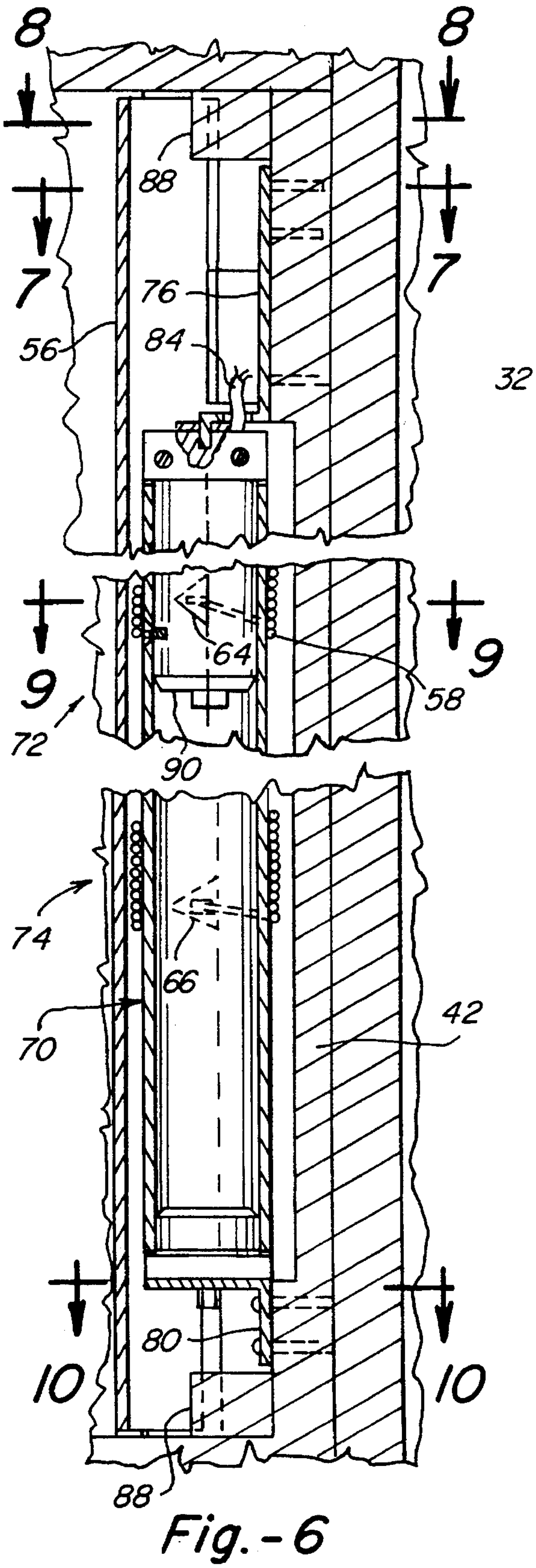
FIG. 6 is an additional cut-away, side elevational view of the window system of FIG. 5 taken substantially along section line 6—6 thereof further illustrating the rotational attachment of the spindle to the jamb edge of the window frame.
Figure 5:
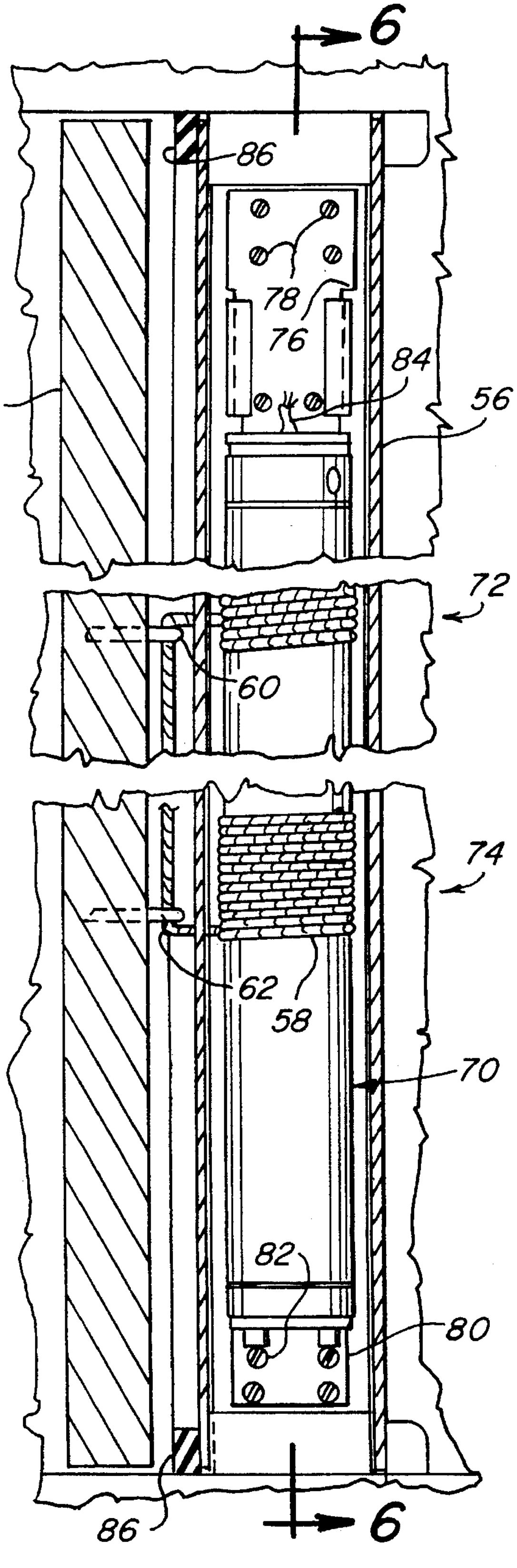
FIG. 5 is a partially cut-away, side elevational view of the window system of FIG. 4 taken substantially along section line 5—5 thereof and illustrating the motorized spindle of a particular embodiment of the present invention having the opposing ends of the cord wound adjacent the upper and lower spindle ends and the rotational attachment of the spindle to the jamb edge of the window frame.

With reference additionally now to FIGS. 5 and 6, further details of the motor driven spindle 70 adjacent the jamb frame member 42 are shown. The spindle 70 comprises an elongate tube and has an upper wrapping position 72 to which one end of the cord 58 is attached and a corresponding lower wrapping position 74 to which the opposite end of the cord 58 is attached. The cord 58 may be attached to the spindle 70 by means of filament tape, glue or other suitable means to ensure that as the spindle 70 rotates, the cord 58 is either wrapped or unwrapped about the periphery of the spindle 70 at the upper and lower wrapping positions 72, 74 thereof. The spindle 70 is rotatably secured to the jamb frame member 42 by means of an upper bracket 76 having a number of mounting points 78 formed therethrough to enable conventional wood screws or other suitable means of attachment for securing the upper bracket 76 to the jamb frame member 42. Correspondingly, a lower bracket 80 adjoins the lower end of the spindle 70 to rotatably secure the spindle 70 to the jamb frame member 42. The lower bracket 80 likewise includes a plurality of mounting points 82 for receiving a number of wood screws or other suitable attaching hardware for mounting the lower bracket 80 to the jamb frame member 42 adjacent the lower frame member 38.

A number of electrical leads 84, extend through the upper portion of the spindle 70 to provide bidirectional electrical control to a motor 90 circumferentially surrounded by the spindle 70 tube. The motor 90 may be bidirectionally controlled in a conventional manner in order to cause the spindle 70 to rotate in either a clockwise or counterclockwise direction in response thereto. The switching circuitry for controlling the motor 90 may also include a function whereby actuation of a switch will cause the motor to drive the spindle 70 to either fully open or fully close the window in response to a momentary actuation thereof. Alternatively, the switch may be utilized to control the motor 90 such that it causes the spindle 70 to rotate only so long as the switch is held in a given position thereof.

In a preferred embodiment, the spindle 70 in conjunction with the internal motor 90 and an integral rotational limit switch 104 may be supplied as a conventional curtain motor operator available from Somfy Systems, Inc., 47 Commerce Drive, Cranbury, N.J. 08512. The appropriate operator selected will depend, to some extent, upon the length of the jamb frame member 42 in any particular window system 10. The operators also incorporate a power-off locking feature for maintaining the spindle 70 at any given position between its rotational limits (as adjustably determined by the limit switch 104) when power is removed from the internal motor 90.

With particular reference to FIG. 5, it can be seen that a length of weatherstripping 86 is interposed between the sash 16 and frame 22 of the window system 10 to provide weatherproofing for the window system 10 when the hinged window 12 is in the fully "closed" position thereof. With particular reference to FIG. 6, the spindle cover 56 can be seen to be maintained in a position surrounding the spindle 78 by means of a pair of upper and lower cover mounting blocks 88 as will be :shown with more specificity with respect to FIG. 8.

Figure 7:
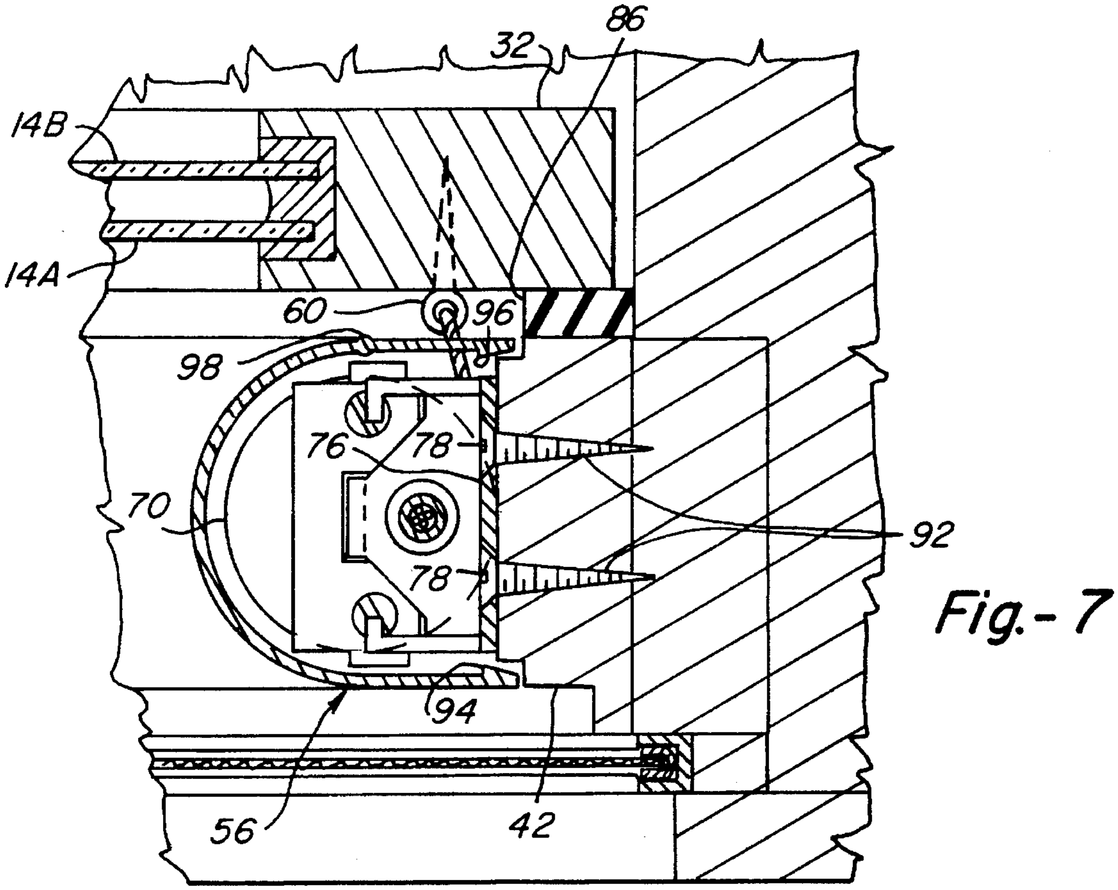
FIG. 7 is a partial cross-sectional, top plan view of the window system of FIG. 6 taken substantially along section line 7—7 thereof illustrating the upper bracket for rotatably retaining the spindle as well as the surrounding spindle cover.
Figure 8:
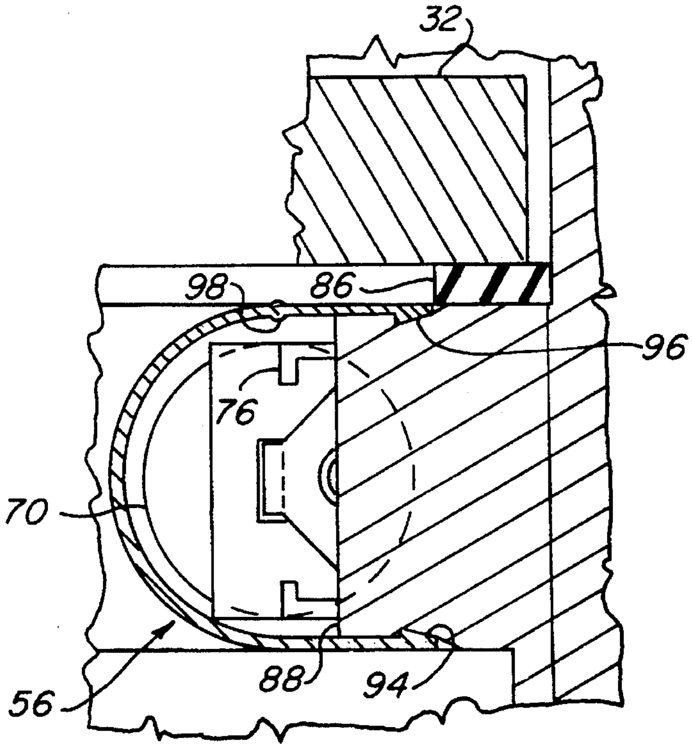
FIG. 8 is an additional, partial cross-sectional, top plan view of the window system of FIG. 6 taken substantially along section line 8—8 thereof and illustrating the upper bracket adjacent the upper edge of the window frame.

With reference additionally now to FIGS. 7, 8, 9, and 10, various cross-sectional views of the spindle 70 and spindle cover 56 are shown adjacent the jamb frame member 42 of the window system 10. With particular reference to FIG. 7, the upper bracket 76 is shown including a number of screws 92 extending through the mounting points 78 for securing the upper bracket 76 to the jamb frame member 42. With particular reference to FIG. 8, the upper portion of the spindle cover 56 is shown at the upper one of the cover mounting blocks 88 thereof. As can be seen, the spindle cover 56 is removably secured adjacent the jamb frame member 42 by means of a pair of longitudinally extending inner and outer lips 94, 96 which engage corresponding notches within the upper and lower cover mounting blocks 88. The spring-like action of the material of the spindle cover 56 adjacent the inner and outer lips 94, 96 maintain the spindle cover 56 in position with respect thereto. As can be seen, the spindle cover 56 may be supplied in any number of standard lengths and be made available pre-primed ready for painting to match the color of the frame 22 and cut to selective lengths for easy installation and removal over the spindle 70.

As further illustrated in FIGS. 7–10, the spindle cover 56 further may comprise a longitudinally extending bead 98 formed in the structure of the spindle cover 56 to provide an indication for the depth of cut required to form the upper and lower cord guide notches 64, 66 adjacent the upper and lower wrapping positions 72, 74 about the spindle 70. In some applications, the bead 98 may be replaced by a longitudinally extending trench or other indicator for determining the depth of the upper and lower cord guide notches 64, 66. The upper and lower cord guide notches 64, 66 may likewise be cut from the structure of the spindle cover 56 on site to allow for ready adaptation of the combined motor driven spindle 70 and spindle cover 56 to the particular dimensions of a given window system 10 and as determined by the positions of the upper and lower threadable pulls 60, 62.

Figure 9:
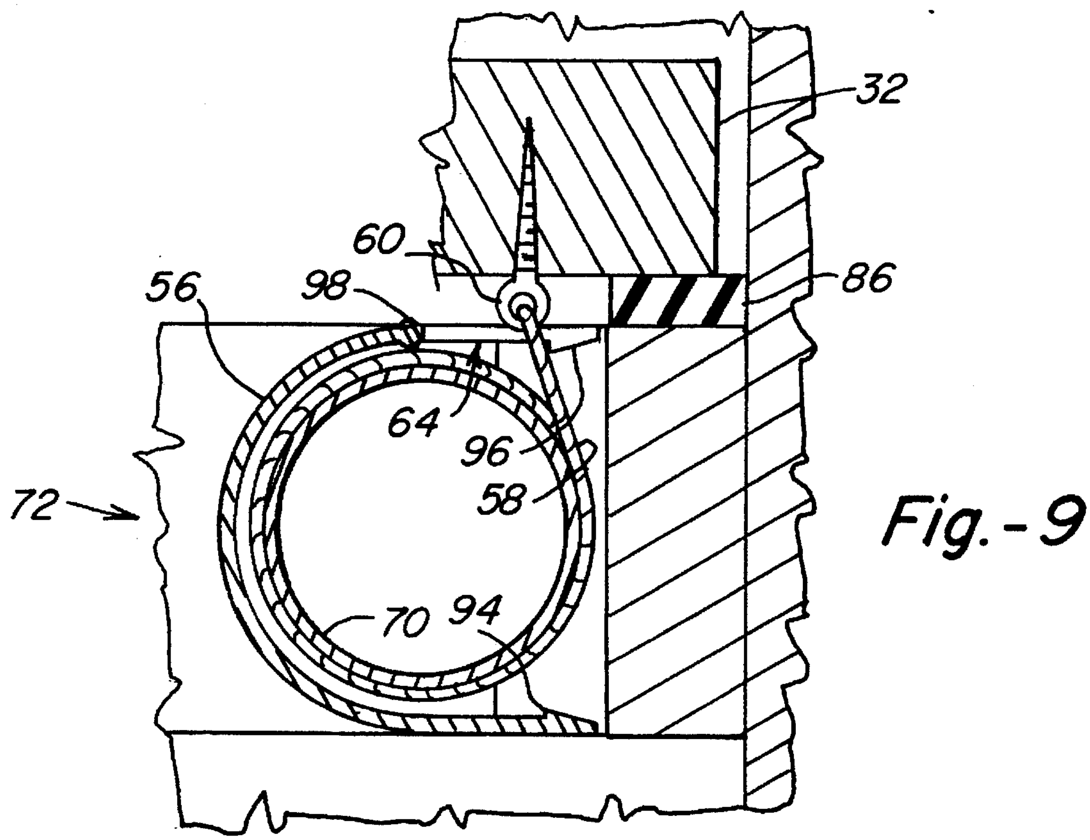
FIG. 9 is a further, partial cross-sectional, top plan view of the window system of FIG. 6 taken substantially along section line 9—9 thereof and illustrating the spindle and cord wound therearound adjacent the upper cord guide notch formed in the spindle cover.

With reference to FIG. 9, the upper wrapping position 72 surrounding the spindle 70 is shown. The lower wrapping position (now shown) will present corresponding structure at that location about the spindle 70. As can be seen, as the cord 58 is wound fully about the spindle 70, the upper threadable pull 60 (and corresponding lower threadable pull 62) and the respective threadable pull positions on the cord 58 are drawn toward the spindle 70 when the hinged window 12 is in the fully "closed" position thereof.

Figure 10:
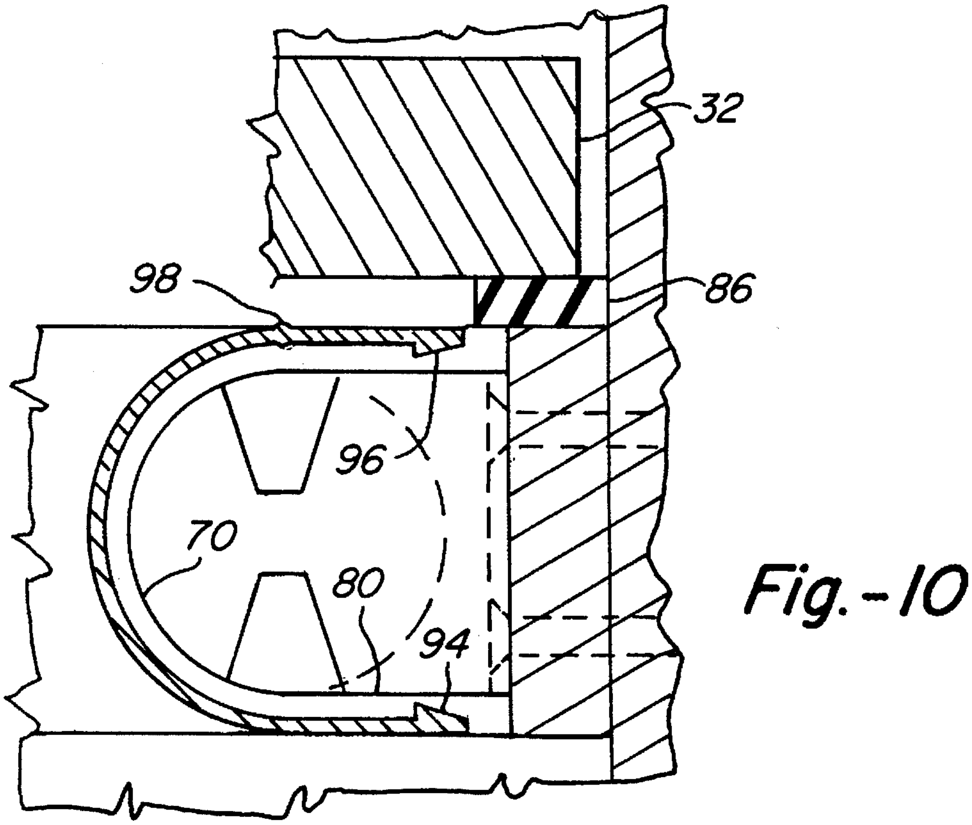
FIG. 10 is yet another, partial cross-sectional, top plan view of the window system of FIG. 6 taken substantially along section line 10—10 thereof and illustrating the lower bracket for rotationally maintaining the spindle in position adjacent the jamb edge of the window frame.

With reference specifically to FIG. 10, the lower bracket 80 is shown adjoining the lower end of the motorized spindle 70 to further illustrate the details thereof. In a preferred embodiment, the upper and lower brackets 76, 80 may be formed of steel or similar suitable material and the upper bracket 76 may further be designed to include an electrical junction box (for attachment of the leads 84 shown in FIGS. 5 and 6) which may be formed as a portion of the upper bracket 76 to further facilitate the interconnection of electrical connections to the motor 90.

Figure 11:
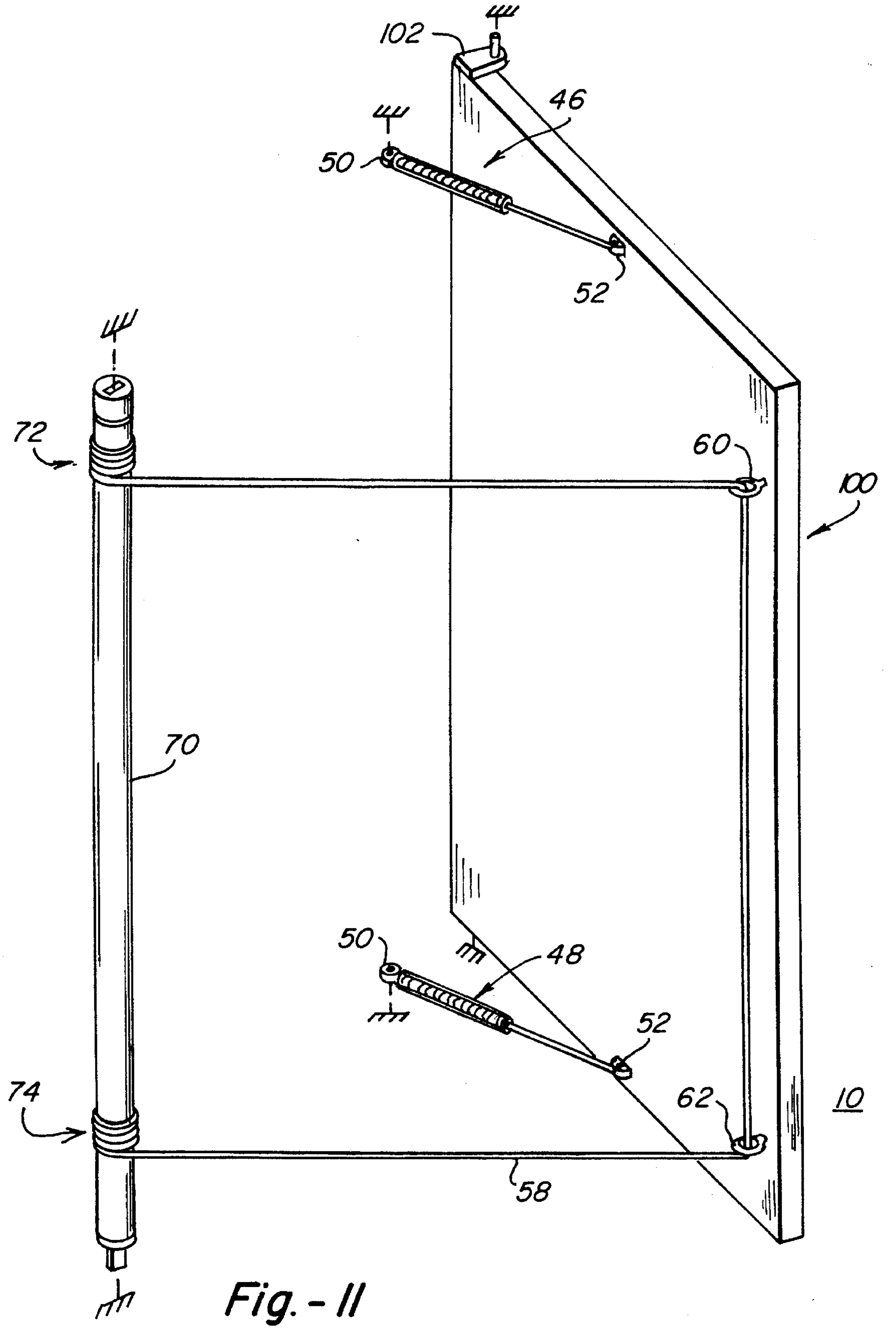
FIG. 11 is a simplified schematic illustration of the window system of the preceding figures useful in understanding the opposing forces applied to the hinged window to selectively position the same with respect to the corresponding window frame.

With reference additionally now to FIG. 11, the window system 10 of the present invention is shown in schematic detail to further clarify and illustrate the principals of operation thereof. In this illustration, the hinged window 12 is illustrated as a panel 100 hingedly affixed to a frame by means of a pair of upper and lower hinges 102. The panel 100 may be a translucent or transparent window panel in window related applications or comprise an opaque element in ventilation applications.

In operation, the upper and lower gas springs 46, 48 force the panel 100 to rotate about the upper and lower hinges 102 to open the panel 100 with respect to a corresponding frame element. The hinges 102 and proximal ends 50 of the upper and lower gas springs 46, 48 may be positioned in varying relationships with respect to each other but are optimally positioned a relatively short distance from each other in order to maximize the force exerted by the upper and lower gas springs 46, 48 when the panel 100 is in the fully "open" position thereof and to minimize forces when the panel 100 is in the fully "closed" position thereof. In a preferred embodiment, the distal ends 52 of the upper and lower gas springs 46, 48 are positioned somewhat mid-point of the panel 100 between the proximal hinged edge and the distal jamb edge.

The spindle 70 is preferably positioned adjacent, or within, the jamb portion of the frame corresponding to the panel 100 to provide optimal location of the force opposing the opening force exerted by the upper and lower gas springs 46, 48 as well as to visually blend the same with respect to the jamb frame member. As the spindle 70 winds and unwinds about the upper and lower wrapping positions 72, 74 thereof, threadable pull points on the cord 58 adjoining the upper and lower threadable pulls 60, 62 are either drawn toward, or allowed to recede from, the spindle 70 to selectively position the panel 100 about the upper and lower hinges 102.

Due to the fact that the cord 58 is not rigidly affixed to either of the upper or lower threadable pulls 60, 62, the cord 58 is allowed to slide with respect to these points at a corresponding number of threadable pull positions therealong. As a result, the opposing forces applied to the locations of the threadable pulls 60, 62 on the panel 100 sash remain equalized in the event that the cord 58 were to wrap over itself at either the upper or lower wrapping positions 72, 74 due to buffeting of the panel 100 during a closing operation or other factors. This is a potentially important consideration inasmuch as uneven winding of the cord 58 might otherwise result in a disparity of forces exerted at the upper and lower threadable pulls 60, 62 in the event that the cord 58 were substantially affixed thereto and ultimately result in an uneven seal in the fully "closed" position.

The use of a cord 58 to oppose the forces exerted by the upper and lower gas springs 46, 48 also provides significant advantages in the event power is interrupted to the motor driving the spindle 70. Should the panel 100 be in an "open" position while this occurs, the cord 58 may be manually grasped in order to pull the panel 100 inward to a position parallel with the corresponding frame. At this point, a conventional latch or other locking mechanism (not shown) may be utilized to hold the window panel 100 closed against the bias provided by the upper and lower gas springs 46, 48.

What has been provided, therefore, is an automated window system and method which resists breakage due to buffeting or other forces and may be readily closed manually in the event of power interruption. The window system and method of the present invention is efficient and straightforward in design and inherently highly leveraged providing efficient application of opposing opening and closing forces with respect to the hinged window panel. In operation, the design results in relatively little pressure being required to open the window while maximum opening force is maintained at the fully "open" position.

The system and method of the present invention is inexpensively implemented, adaptable and may be simply implemented as a new or replacement window or easily added to conventional hinged windows in existing construction without specialized equipment or extensive modifications to the wall surrounding the window frame. The system and method herein disclosed results in a visually pleasing design that has extensive applications in conjunction with, for example, passive solar homes in which the opening and closing of selected windows may be computer controlled in response to ambient wind, precipitation and temperature conditions.

While there have been described above the principals of the present invention in conjunction with specific apparatus, it is to be clearly understood that the foregoing description is made only by way of example and not as a limitation to the scope of the invention. Particularly, and without limitation, the principles disclosed herein with respect to a hinged window are likewise applicable to electrically operated awning, hopper and casement windows as well as to roof mounted skylights and ventilation panels.

What is claimed is:

1. An actuation system for a window including at least one window panel having a peripherally surrounding window sash disposed in a hinged relationship with respect to a window frame, said window frame having a hinged frame member and a jamb member that are parallel and spaced-apart, said window sash presenting parallel, spaced-apart and oppositely disposed proximal and distal members and parallel, spaced-apart and oppositely disposed first and second portions extending between said proximal and distal members, said proximal member being hinged to said hinged frame member, said actuation system comprising:

first and second expansible spring means coupling said window frame and said first and second portions of said window sash for force biasing said window sash toward an open relationship with respect to said window frame;

first and second spaced-apart threadable pulls affixed to said distal portion of said window sash for threadably guiding a mid-portion of a cord having first and second ends, said cord for opposing a bias force exerted on said window sash by said first and second expansible spring means; and a spindle motor in conjunction with said jamb member, said spindle motor including a generally elongate spindle having first and second ends thereof rotatably secured to said jamb member, said first and second ends of said cord being coupled to said first and second ends of said generally elongate spindle, said spindle motor for selectively winding and unwinding varying lengths of said first and second ends of said cord about said elongate spindle to position said window sash with respect to said window frame.

2. The actuation system of claim 1 wherein said first and second expansible spring means comprise first and second gas springs.

3. The actuation system of claim 1 wherein said spindle motor comprises a motorized operator having an integral power-off locking mechanism.

4. The actuation system of claim 1 further comprising first and second cut-outs in said window frame for respectively receiving said first and second expansible spring means when said window sash is in a closed position with respect to said window frame.

5. The actuation system of claim 1 further comprising an elongate spindle cover surrounding said elongate spindle, said spindle cover having first and second cord guide notches for respectively receiving said first and second ends of said cord.

6. The actuation system of claim 1 wherein said spindle cover includes first and second indicators for determining a dimension respectively of said first and second cord guide notches.

7. A method of making a window panel having a peripherally surrounding window sash that is pivotally mounted on a pivot axis with respect to a window frame, said method comprising the steps of:

providing force means coupling said window sash and said window frame for biasing said window panel toward an open pivoted relationship relative to said window frame by application of a biasing force therebetween;

providing a spindle motor in conjunction with said window frame including a generally elongate spindle having a first and a second end, said spindle having an axis that is spaced from and generally parallel to said pivot axis, and said spindle for winding first and second ends of an elongated cord therearound;

attaching said first end of said cord to said first end of said elongate spindle;

affixing a first threadable pull to said window sash;

affixing a second threadable pull to said window sash, said second threadable pull being spaced from said first threadable pull;

threading said second end of said cord through said first and second threadable pulls; and attaching said second end of said cord to said second end of said spindle whereby selective winding and unwinding said first and second ends of said cord about said spindle in response to actuation of said spindle motor opposes said force means to selectively position said window panel with respect to said window frame.

8. The method of claim 7 wherein said force means comprises gas spring means.

9. The method of claim 7 further comprising the steps of:

providing an elongate spindle cover for said spindle; and removing first and second selected portions of said spindle cover to provide first and second guides for winding of said first and second ends of said cord about said spindle.

10. The method of claim 9 wherein said step of removing comprises the step of:

cutting said cover to a selected depth at said first and second portions generally corresponding to corresponding positions of said first and second threadable pulls.

11. The method of claim 7 further comprising the step of:

selectively applying electric current to said spindle motor to thereby bidirectionally control rotation of said spindle about said spindle axis, and to thereby selectively wind or unwind said cord.

12. An actuation system for a window having at least one window panel that is disposed in a hinged relationship with respect to a rectangular-shaped and stationary window frame;

said window frame having a hinged frame member and a jamb member that are oppositely disposed, spaced-apart, and parallel;

said window frame having first and second oppositely disposed, spaced-apart, and parallel frame members that extend in a perpendicular direction between said hinged frame member and said jamb member;

said window panel being carried within a rectangular-shaped and movable sash;

said sash having oppositely disposed, spaced-apart, and parallel proximal and distal portions that extend respectively parallel to said hinged frame member and said jamb member;

said sash having oppositely disposed, spaced-apart, and parallel first and second portions that extend in a perpendicular direction between said proximal and distal portions; and said proximal portion of said sash being hinged to said hinged frame member, said actuation system comprising:

first and second force means coupled to exert an opening-force for force biasing said sash toward an open relationship with respect to said window frame;

said first force means exerting a first opening-force between said first frame member and said first portion of said sash;

said second force means extending a second opening force between said second frame member and said second portion of said sash;

a first flexible cord extending between said distal portion of said sash at a location that is adjacent to said first portion of said sash, and said jamb member at a location that is adjacent to said first frame member;

a second flexible cord extending between said distal portion of said sash at a location that is adjacent to said second portion of said sash, and said jamb member at a location that is adjacent to said second frame member; and cord-length adjustment means located at said jamb member for simultaneously operating upon said first and second cords to maintain said movable sash in a selected position with respect to said window frame.

13. The actuation system of claim 12 wherein said first and second force means comprise:

first and second linear gas springs having opposite ends thereof hingedly secured respectively to said first frame member and said first portion of said sash, and to said second frame member and said second portion of said sash.

14. The actuation system of claim 13 further comprising:

first and second cut-outs respectively in said first and second frame members for respectively receiving said first and second gas springs when said movable sash is in a closed position with respect to said window frame.

15. The actuation system of claim 14 including:

spindle means mounted on said jamb member to effectuate simultaneous spooling of said first and second cords about said spindle means.

16. The actuation system of claim 14 wherein:

said first and second cords are interconnected by an intermediate cord portion that extends parallel and adjacent to said distal sash portion;

said first cord, intermediate cord portion, and second cord being slidably secured to said distal sash portion by way of a first and a second threadable pull;

said first and second threadable pulls being respectively located on said distal portion of said sash at said location adjacent to said first portion of said sash, and at said location adjacent to said second portion of said sash.

17. The actuation system of claim 16 wherein:

said spindle means comprises an elongated and cylindrical spindle having first and second ends rotatably secured to said jamb member.

18. The actuation system of claim 17 including:

an elongated spindle cover for said cylindrical spindle, said spindle cover having first and second cord guide notches for receiving respectively said first and second cords.

* * * * *